A. A. HOAGLAND & W. MICKEL.
Mortar-Mixers.

No. 143,575.  Patented Oct. 14, 1873.

Witnesses:
Alex Lynch
W. E. Chaffee

Inventor:
Abram A. Hoagland
William Mickel
by G. H. Ferriss

UNITED STATES PATENT OFFICE.

ABRAM A. HOAGLAND AND WILLIAM MICKEL, OF ONEONTA, NEW YORK.

IMPROVEMENT IN MORTAR-MIXERS.

Specification forming part of Letters Patent No. 143,575, dated October 14, 1873; application filed July 15, 1873.

*To all whom it may concern:*

Be it known that we, ABRAM A. HOAGLAND and WILLIAM MICKEL, of Oneonta, in the county of Otsego and State of New York, have invented certain new and useful Improvements in Mortar-Mixer; and we do hereby declare the following to be a full, clear, and exact description of the invention, such as will enable others skilled in the art to which it pertains to make and use it, reference being had to the accompanying drawings, which form part of this specification.

Figure 1:
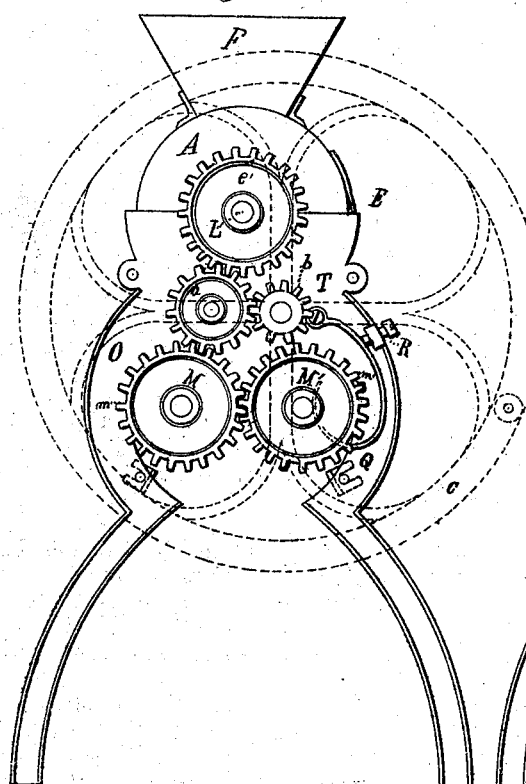
Figure 2:
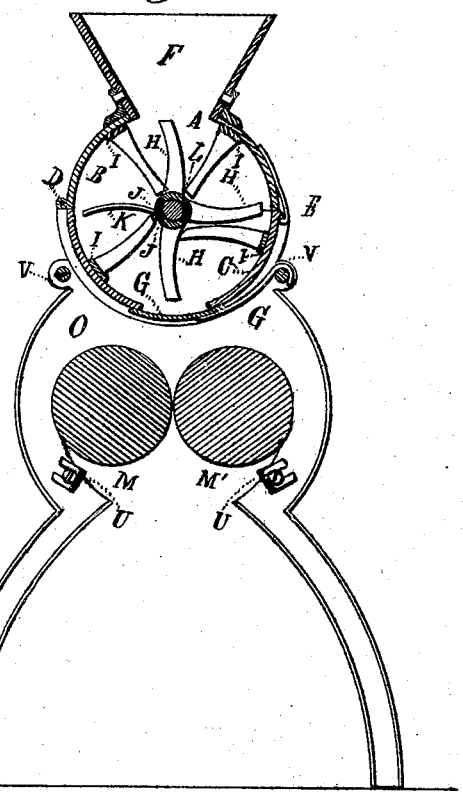
Figure 3:
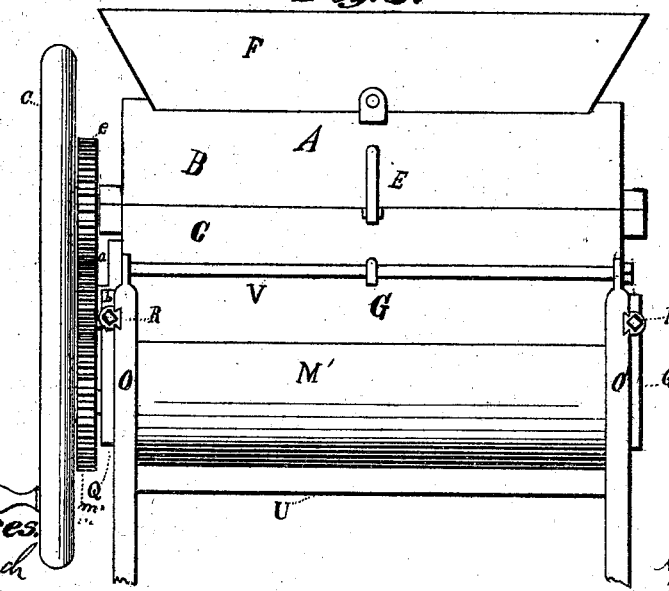

Figure 1 is an end elevation. Fig. 2 is a vertical transverse sectional view. Fig 3 is a side elevation of a machine embodying our improvements.

This invention relates to an improvement in machines for mixing and tempering mortar; and consists in the combination of the cylinder and gate and hopper, and devices connected with the cylinder, as hereinafter more fully described and pointed out by the claims.

In the accompanying drawing, the cylindrical chamber A is divided, through its longitudinal center, into two parts, B and C, hinged together at D, and provided with a spring-clasp, E, for holding it closed. A hopper, F, through which the materials are fed, rests upon, and is secured to, the chamber A. A removable sliding gate, G, having a hooked handle, V, forms the bottom portion of the mixing-chamber A. Teeth or blades H, for mixing the mortar, are cast in rows on ribs I and J. The under side of the ribs I are convex, and the under side of the ribs J are concave. One of the ribs J is provided with feeding-blades K, which are broader and thinner than the teeth H. The ribs I are secured to the inside of the chamber A by screws or bolts; and the ribs J are screwed or bolted to the rotary shaft L, which traverses the chamber A, through its longitudinal center, in such a manner that the teeth H and the blades K on the ribs J pass between the teeth H on the ribs I. Two cylinders, M M', are supported, side by side, in articulating bearings attached to the outside of the ends of the frame O of the machine, in such a manner as to bring their contiguous peripheral lines of the cylinder directly beneath the gate G in the bottom of the chamber A. The bearings of the cylinder M' rest against short studs on the ends of the frame O at its right-hand side. The bearings of the cylinder M are held in place by springs Q, provided with set-screws R for regulating their pressure upon said bearings. The extent of the friction between the cylinder M M' is, therefore, governed by the strength of the springs Q, which are secured to the frame by screws T. Removable scrapers U are secured to the frame O, just beneath the cylinders M M', for cleaning them. Stay-rods V, upon one of which the hooked handle V of the gate G rests when closed, strengthen the frame near the chamber A. The cylinders M M' are provided with spur-wheels $m$ $m'$; the rotary shaft L with a spur-wheel, $e'$. A spur-wheel, $a$, receives motion from a small spur-wheel, $b$, on the shaft to which the band-wheel or hand-wheel $c$ is fixed, and communicates it to the wheels $e'$ and $m$, and the latter communicates it to $m'$.

The sand, lime, water, hair, &c., or whatever material may be used, is fed to the mixing-chamber A through the hopper F, and, after being thoroughly mixed by the teeth H and feeding-blades K, falls through the open gate G upon the cylinders M M', between which it is passed, thereby thoroughly crushing all particles of lime.

The chamber A can be readily opened to remove any stones, &c., which may be accidentally fed to the machine. The articulating bearings M M', governed by the springs Q, permit the cylinders to yield to any substance harder than the lime, thereby lessening the probability of breaking the gearing of the machine.

Having thus described our invention, what we claim as new and useful, and desire to secure by Letters Patent, is—

1. The combination, in the cylinder, of the part B, provided with hopper F, and the part C, having the sliding gate G, the parts being connected by hinge D, to form the cylinder, substantially as and for the purposes set forth.

2. In a mixing-machine, the ribs I and J, provided with the teeth or blades H or K, for attachment, respectively, to the cylinder and shaft, as and for the purposes set forth.

In testimony that we claim the foregoing we have hereunto set our hands this 9th day of June, 1873.

ABRAM A. HOAGLAND.
WILLIAM MICKEL.

Witnesses:
WILLIAM D. BISSELL,
HENRY B. HUDSON.